US009721467B2

(12) United States Patent
Neser et al.

(10) Patent No.: US 9,721,467 B2
(45) Date of Patent: Aug. 1, 2017

(54) LED TRAFFIC LAMP CONTROL SYSTEM

(71) Applicant: GE Lighting Solutions, LLC, East Cleveland, OH (US)

(72) Inventors: Morne Neser, Montreal (CA); Truong-Khoa Nguyen, St Laurent (CA); Christian Poirier, Montreal (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 14/434,843

(22) PCT Filed: Oct. 11, 2013

(86) PCT No.: PCT/US2013/064500
§ 371 (c)(1),
(2) Date: Apr. 10, 2015

(87) PCT Pub. No.: WO2014/059247
PCT Pub. Date: Apr. 17, 2014

(65) Prior Publication Data
US 2015/0302746 A1 Oct. 22, 2015

Related U.S. Application Data

(63) Continuation of application No. 13/650,681, filed on Oct. 12, 2012, now abandoned.

(51) Int. Cl.
G08G 1/095 (2006.01)
G08G 1/085 (2006.01)
H05B 37/02 (2006.01)

(52) U.S. Cl.
CPC ............ *G08G 1/095* (2013.01); *G08G 1/085* (2013.01); *H05B 37/0281* (2013.01); *Y02B 20/42* (2013.01)

(58) Field of Classification Search
CPC ...................................................... G08G 1/095
(Continued)

(56) References Cited

U.S. PATENT DOCUMENTS 1,832,510 A * 11/1931 Seese ..................... G08G 1/085
315/179
1,835,916 A * 12/1931 Vickery ................ G08G 1/085
340/926

(Continued)

FOREIGN PATENT DOCUMENTS

CN 2502341 Y 7/2002
CN 1393118 A 1/2003

(Continued)

OTHER PUBLICATIONS

Unofficial English translation of Chinese Office Action issued in connection with corresponding CN Application No. 201380053036.X on Jan. 26, 2016.

(Continued)

*Primary Examiner* — Eric M Blount
(74) *Attorney, Agent, or Firm* — GE Global Patent Operation; Peter T. DiMauro

(57) ABSTRACT

A traffic lamp and a method of controlling the traffic lamp based on a power signal are provided. The traffic lamp can include a controller and a light emitting element When a plurality of light emitting elements is included in the traffic lamp, each light emitting element is coupled with a separate controller. Each controller can be configured to include a predetermined light emitting timing sequence for the corresponding light emitting element. When the power signal is supplied to the traffic lamp, each controller determines a power signal characteristic such as a frequency or a period of the power signal and controls a light output of the light emitting element: based on the power signal characteristic and the light emitting timing sequence. A plurality of light (Continued)

emitting elements can be synchronized using the power signal applied to the traffic lamp.

17 Claims, 5 Drawing Sheets

(58) Field of Classification Search
USPC .......................................................... 340/907
See application file for complete search history.

(56) References Cited

U.S. PATENT DOCUMENTS

| | | | | |
|---|---|---|---|---|
| 1,879,213 | A * | 9/1932 | Hall | G08G 1/085 |
| | | | | 200/1 R |
| 1,892,684 | A * | 1/1933 | Robertson | G03B 15/00 |
| | | | | 396/341 |
| 1,926,833 | A * | 9/1933 | Bechtold | G08G 1/085 |
| | | | | 200/19.17 |
| 3,376,546 | A * | 4/1968 | Cress, Jr. | G08G 1/08 |
| | | | | 340/917 |
| 3,525,980 | A * | 8/1970 | Cress, Jr. | G08G 1/085 |
| | | | | 340/909 |
| 3,763,466 | A * | 10/1973 | Howard | G08G 1/07 |
| | | | | 340/912 |
| 4,008,404 | A | 2/1977 | Foreman | |
| 4,061,903 | A | 12/1977 | Battle | |
| 4,370,718 | A | 1/1983 | Chasek | |
| 4,462,031 | A * | 7/1984 | Johnson | G08G 1/082 |
| | | | | 340/309.16 |
| 4,472,714 | A | 9/1984 | Johnson | |
| 6,445,139 | B1 | 9/2002 | Marshall et al. | |
| 2009/0167210 | A1 | 7/2009 | Nguyen et al. | |
| 2012/0242507 | A1 | 9/2012 | Nguyen et al. | |

FOREIGN PATENT DOCUMENTS

| | | |
|---|---|---|
| GB | 1154131 A | 6/1969 |
| GB | 1431901 A | 4/1976 |

OTHER PUBLICATIONS

PCT Search Report and Written Opinion dated Feb. 25, 2014 from corresponding PCT Application No. PCT/US2013/064500.
New York State Department of Transportation Engineering Instruction: "Traffic Signals—Light Emitting Diode (LED) modules", Apr. 22, 2009.
Office Action dated Jan. 31, 2014 which was issued in connection to related U.S. Appl. No. 13/650,681, filed Oct. 12, 2012.

* cited by examiner

LED TRAFFIC LAMP CONTROL SYSTEM

FIELD OF THE INVENTION

The present disclosure relates to a traffic lamp and more particularly to a system and method of controlling a traffic lamp based on a power signal.

BACKGROUND OF THE INVENTION

A traffic lamp can be a signaling device to control traffic flow or to provide an alert or indication to traffic. Traditionally, traffic lamps used incandescent lamps as a light source. However, light emitting diodes (LEDs) are replacing the incandescent lamps because of reduced energy consumption and longer life.

Conventionally, LED traffic lamps are controlled in the same way the incandescent traffic lamps. For instance, a single control box is provided externally to the traffic lamp and is coupled with all the lamps of the traffic lamp. The control box can control the timing of the lights by turning on and off the power signal provided to the lamps of the traffic lamp. This configuration increases the complexity of the traffic lamp control system because additional components and control methods are necessary to synchronize a plurality of lamps within the traffic lamp.

Thus, a need exists for a system and method that can improve timing synchronization between a plurality of lamps within a traffic lamp.

BRIEF DESCRIPTION THE INVENTION

This disclosure is directed to an improved system and method for controlling a traffic lamp based on a power signal. Embodiments of the system and method offer one or more differences and/or advantages over prior systems and methods.

Embodiments of the present disclosure provide systems and methods of controlling a traffic lamp based on a power signal. Unlike prior systems where control of the timing sequences of the traffic lamp were performed remotely from the traffic lamp, embodiments of the traffic lamp, as described herein, can include a controller coupled with a light emitting element within the traffic lamp. A power signal can be provided to the traffic lamp and the controller can determine a power signal characteristic based on the power signal. The power signal characteristic can be used to control the light emitting timing of the light emitting element. By eliminating a separate and remote control system, embodiments of the present disclosure can be characterized by implementing fewer system devices with more compact circuitry that can more accurately control and synchronize light emission in the traffic lamp.

One exemplary aspect of the present disclosure is directed to a traffic lamp. The traffic lamp can include a light emitting element configured to emit light and a controller disposed inside the traffic lamp. The controller can be coupled with the light emitting element. The controller can be configured to control light emission timing of the light emitting element based on a power signal provided to the traffic lamp.

Another exemplary aspect of the present disclosure is directed to a method of controlling a traffic lamp. The method can include receiving a power signal to power the traffic lamp; determining a light emission timing of the traffic lamp based on the power signal; and controlling a light emitting element, with a controller disposed within the traffic lamp, to emit light according to the light emission timing.

Still another exemplary aspect of the present disclosure is directed to a traffic lamp. The traffic lamp can include a plurality of light emitting elements configured to emit light and a plurality of controllers disposed inside the traffic lamp. Each controller can be coupled to a light emitting element. The plurality of controllers can be configured to control light emission timing of the light emitting elements based on a power signal provided to the traffic lamp.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

Reference is now made briefly to the accompanying drawings in which.

DETAILED DESCRIPTION OF THE INVENTION

Figure 1:
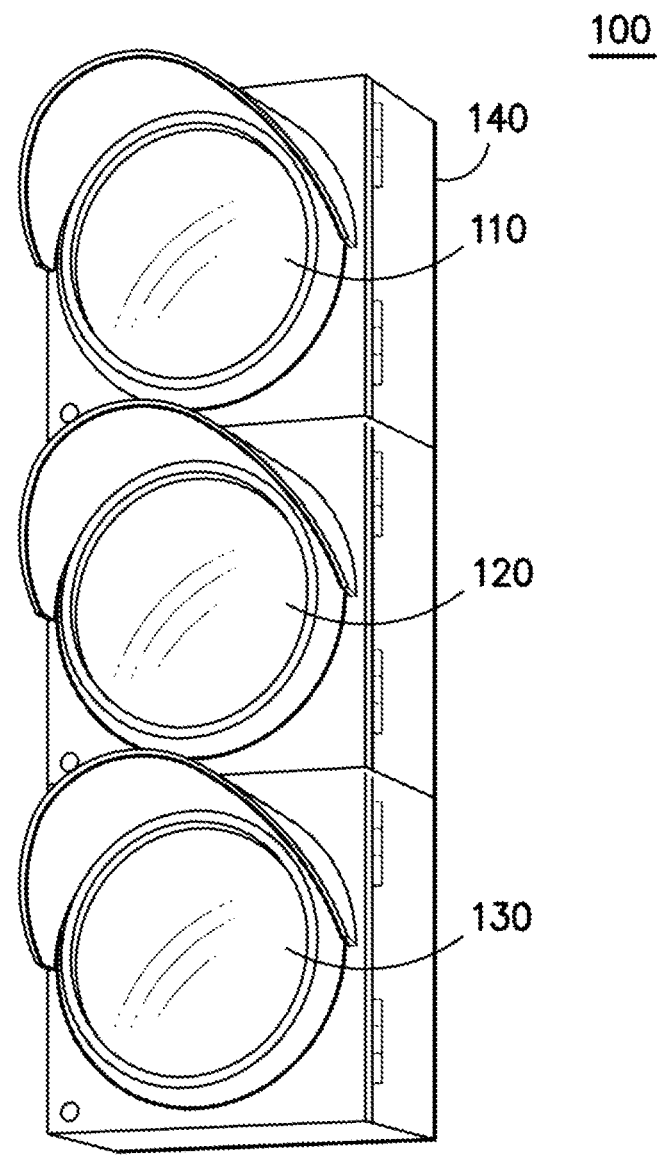
FIG. 1 depicts an exemplary traffic light according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a traffic lamp and a method of controlling the traffic lamp based on a power signal. The traffic lamp can include a controller and a light emitting element. When a plurality of light emitting elements is included in the traffic lamp, each light emitting element can be coupled with a separate controller. Each controller can be configured to include a predetermined light emitting timing sequence for the corresponding light emitting element. When the power signal is supplied to the traffic lamp, each controller determines a power signal characteristic such as a frequency or a period of the power signal and controls a light output of the light emitting element based on the power signal characteristic and the light emitting timing sequence. A plurality of light emitting elements can be synchronized using the power signal applied to the traffic lamp.

FIG. 1 depicts an exemplary traffic lamp 100 according to an exemplary embodiment of the present disclosure. While traffic lamp 100 includes three light emitting elements, any number of light emitting elements in any configuration can be included in a traffic lamp. For instance, traffic lamp can be a flasher that includes two light emitting elements configured side-by-side such that the light emitting elements alternately emit light.

Referring to FIG. 1, traffic lamp 100 can include a first light emitting element 110, a second light emitting element 120, and a third light emitting element 130 within a housing 140. The light emitting elements 110, 120, 130, can be controlled to emit light based on as light emitting timing sequence corresponding to each light emitting element.

A light emitting timing sequence can include information corresponding to the sequence in which each light emitting element is controlled to emit light within the overall traffic lamp 100. The light emitting timing sequence can be a predetermined sequence preprogrammed into each controller coupled with the light emitting elements 110, 120, 130. In one aspect, when the controller controls a light emitting element according to the light emitting timing, sequence, the light emitting element is illuminated such that a light emitting timing for the light emitting element is created. When a plurality of light emitting elements is implemented in a single device, the light emitting timings according to the overall light emitting timing sequence of the device such as traffic lamp 100 can be synchronized based on the power signal. In other words, each controller can use the power signal to determine the individual light emitting timing for the corresponding light emitting element based on the light emitting timing sequence. Subsequently, the illumination of all of the light emitting elements can be synchronized such that the light emitting elements are illuminated according to the light emitting timing sequence where all light emitting elements begin the respective light emitting timing sequence at the same reference point based on the power signal.

Each light emitting element can be controlled to illuminate separately or a plurality of the light emitting elements can be controlled to illuminate simultaneously. In addition, the timing sequence can include information regarding how long each light emitting element emits light during the sequence. For instance, when traffic lamp 100 is a traffic signal light including a red light emitting element, a yellow light emitting element, and a green light emitting element, the timing sequence can have a period of one minute where the green light emitting element is illuminated first for twenty five seconds, the yellow or amber light emitting element is illuminated second for five seconds, and the red light emitting element is illuminated third for thirty seconds.

Alternatively, when traffic lamp 100 is a flasher light, the timing sequence can have a period of two seconds where one light emitting element can be illuminated for one second and a second light emitting element can be illuminated for one second.

The above periods are for purposes of illustration only and the time periods of the light emitting timing sequence can be selected to be any time period. In addition, the light emitting timing sequence can be predetermined prior to installation of the traffic lamp 100.

Traffic lamp 100 can include any color light emitting element. Moreover, traffic lamp 100 can include light emitting elements that correspond to illuminating symbols or characters such as a pedestrian walk symbol or an arrow. When traffic lamp 100 includes an arrow, the timing sequence can contemplate a leading or lagging turn indicator in addition to normal traffic signal operation.

While traffic lamp 100 is illustrated as having a vertical configuration, traffic lam 100 can have any configuration including side-by-side light emitting elements in a vertical configuration or a horizontal configuration.

As described above, in one implementation, traffic lamp 100 can be a single, one-sided device providing traffic indications for only one direction of traffic. In another implementation, traffic lamp 100 can further include two or more sets of light emitting elements for each direction of traffic within a single device. For instance, traffic lamp 100 can be a multi-sided device, such as four-sided, to provide traffic indications for traffic in each direction. In this embodiment, all light emitting elements included within the traffic lamp 100 can be connected to a single power supply signal. This would allow all the light emitting elements to be synchronized with an offset such that the light emitting elements in one direction would signal green, while those in another direction would signal red. In another implementation, a plurality of traffic lamps 100 can be coupled such that a single AC power signal is supplied to all the traffic lamps 100 where all the light emitting elements are synchronized as discussed above and further described below.

Figure 2:
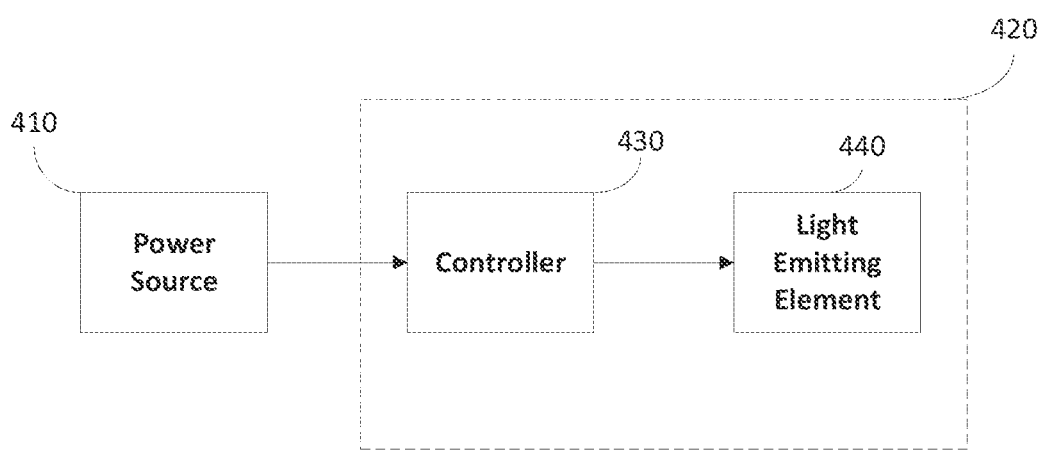
FIG. 2 depicts a block diagram of an exemplary traffic lamp control system according to an exemplary embodiment of the present disclosure.

FIG. 2 depicts a block diagram of an exemplary traffic lamp control system 400 according to an exemplary embodiment of the present disclosure. An external power source 410 can be coupled with a controller 430 of a traffic lamp 420 including at least one light emitting element 440.

The controller 430 can monitor a power signal for a power signal characteristic such as frequency or period of an AC signal. The power signal characteristic can be used to determine the light emitting timing based on the light emitting timing sequence. The controller 430 can initiate luminescence in the light emitting element 440 based on the power signal characteristic and the light emitting timing sequence. After the luminescence period elapses, the controller 430 can deactivate luminescence in the light emitting element 440. The controller 430 can monitor the power signal characteristic, during both the luminescence and non-luminescence periods of the light emitting timing sequence.

Controller 430 can be coupled to the light emitting element 440 and configured to control light emission of the light emitting element 440 based on a light emitting timing sequence and the power signal. The controller 430 and light emitting element 440 can be configured to be OD a single printed circuit board. Alternatively, controller 430 can be positioned anywhere within the traffic lamp 420 provided that it is coupled with the light emitting element 440.

Controller 430 can include as microprocessor that may have as memory and microprocessor, CPU or the like, such as a general or special purpose microprocessor operable to execute programming instructions or micro-control code associated with traffic lamp system control. The memory may represent random access memory such as DRAM or read only memory such as ROM or FLASH. In one embodiment, the processor can execute programming instructions stored in memory. If controller 220 includes a memory, the memory may be a separate component from the processor or may be included onboard within the processor.

Controller 430 can control the light emitting timing of the light emitting element 230 based on the light emitting timing sequence and the power signal. The power signal can be an AC signal having a frequency. For instance, the AC signal can have a frequency of 50 Hz or 60 Hz.

The controller 430 can monitor the power signal and determine a power signal characteristic. The power signal characteristic can be a frequency or a period of the power signal. Using the power signal characteristic, the controller 430 can determine the light emitting timing of the light emitting element 440. In one embodiment of the present invention, the controller 430 can increment a counter for each cycle of the AC power signal. When the counter reaches a predetermined number corresponding to the light emitting timing sequence, the controller 430 modifies the light emission of the light emitting element 440. When a plurality of light emitting elements is used, each controller maintains a counter during the entire light emitting timing sequence.

For example, as discussed above, the light emitting timing sequence of an exemplary traffic signal light includes illuminating the green light emitting element for twenty live seconds, the yellow or amber light emitting element for five seconds, and the red light emitting element for thirty seconds. When the power signal is supplied to the traffic signal light, the controller can initiate illumination of the green light emitting element. The controller can monitor the power supply and increment a counter until the counter is equivalent to twenty five seconds. During this time, the controllers corresponding to the yellow and red light emitting element are also incrementing a counter to monitor the elapsed time interval. Then the controller of the green light emitting element can discontinue illumination and the controller of the yellow light emitting element can initiate illumination. After the counter reaches an interval corresponding to the five second period, the controller of the yellow light emitting element can discontinue illumination and the controller of the red light emitting element can initiate illumination for the thirty second time period.

Light emitting element 440 can include one or more light emitting diodes. In addition, controller 430 can also compensate for light emission degradation over the life of the light emitting element 440. For instance, the controller can measure the temperature and the usage of the light emitting element and use those values to determine the compensation necessary to maintain a uniform luminance level.

Figure 3:
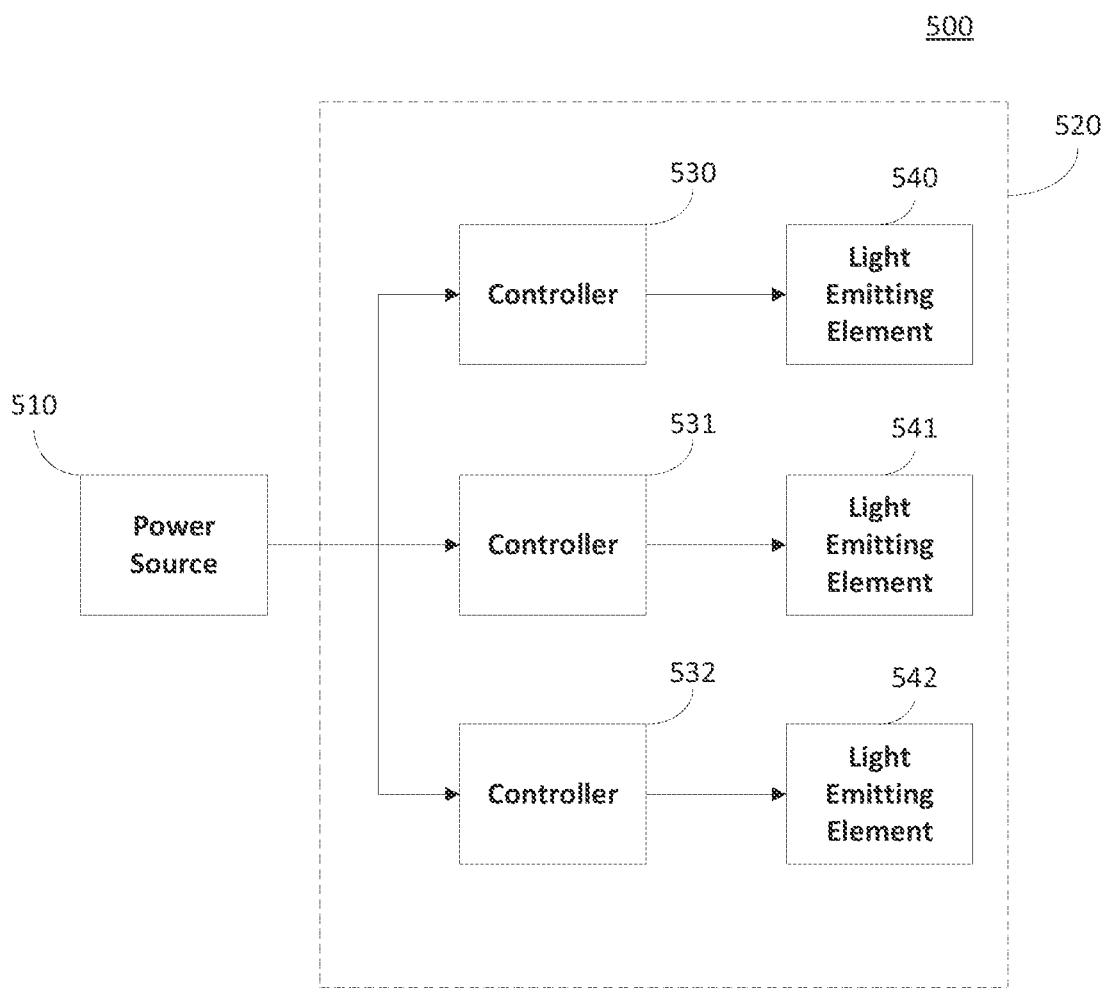
FIG. 3 depicts a block diagram of an exemplary traffic lamp control system according to an exemplary embodiment of the present disclosure.

FIG. 3 depicts a block diagram of an exemplary traffic lamp control system 500 according to another exemplary embodiment of the present disclosure. Traffic lamp control system 500 includes a plurality of light emitting elements 540, 541, 542. Each light emitting element is coupled to a corresponding controller 530, 531, 532 within traffic lamp 520. An external power source 510 is coupled with the controllers 531, 531, 532. Each controller 530, 531, 532 monitors a power signal characteristic to determine luminescence periods for each light emitting element 540, 541, 542. The light emitting timing sequence can be synchronized when all the controllers 530, 531, 532 monitors a power signal characteristic.

Figure 4:
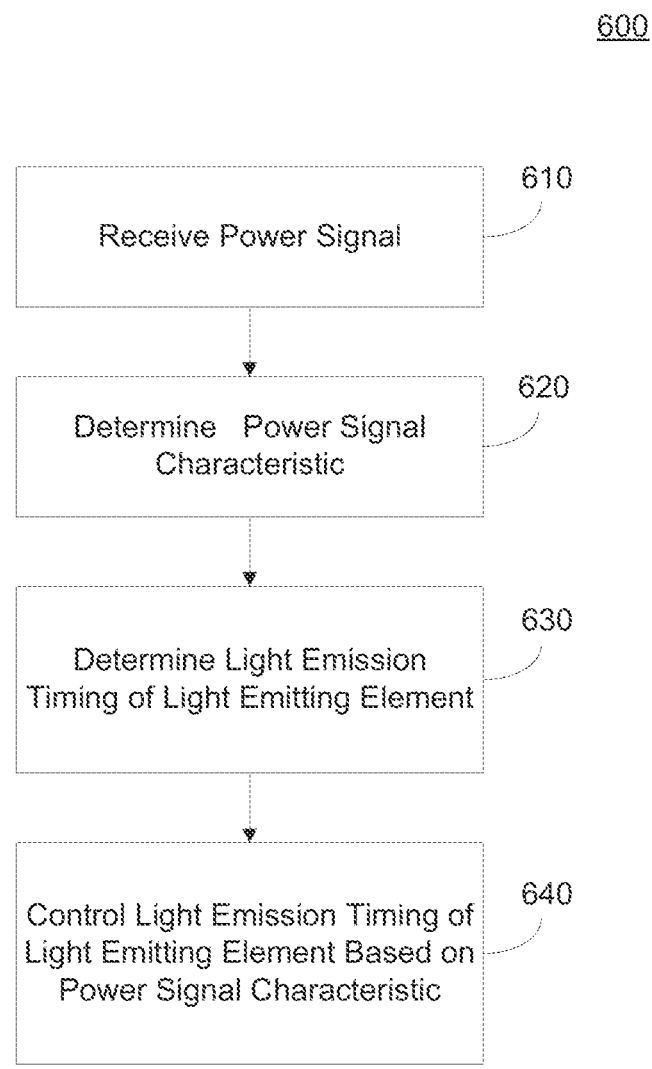
FIG. 4 depicts a flow chart of an exemplary method of controlling as traffic lamp according to an exemplary embodiment of the present disclosure.

FIG. 4 illustrates a flow chart of an exemplary method 600 according to an exemplary embodiment of the present disclosure. The method 600 will be discussed with reference to the exemplary traffic lamp illustrated in FIG. 1. However, the method 600 can be implemented with any suitable traffic lamp control system. In addition although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A controller in a traffic lamp can receive a power signal at (610). At (620) the controller can determine a power signal characteristic based on the power signal. The controller can determine a light emission dining of a light emitting element at (630) and the light emitting timing of the light emitting element can be controlled based on the power signal characteristic at (640).

Figure 5:
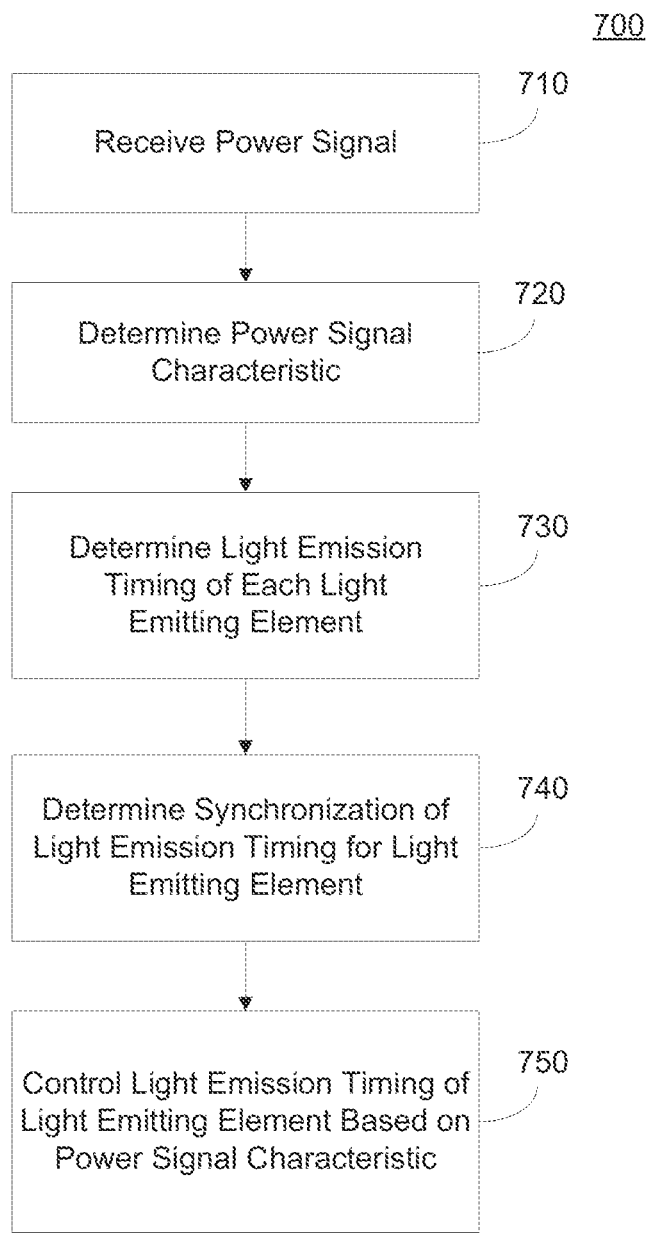
FIG. 5 depicts a flow chart of an exemplary method of controlling a traffic lamp according to an exemplary embodiment of the present disclosure.

FIG. 5 illustrates a flow chart of an exemplary method 700 according to an exemplary embodiment of the present disclosure. The method 700 will be discussed with reference to the exemplary traffic lamp illustrated in FIG. 1. However, the method 700 can be implemented with any suitable traffic lamp control system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

When a traffic lamp includes a plurality of light emitting elements, each light emitting element can correspond to a separate controller. Each controller can receive a power signal at (710) and determine a power signal characteristic based on the power signal at (720). The light emission timing of each light emitting element can be determined at (730) and synchronization between all of the light emitting elements can be determined at (740). Each controller can control the light emission timing of the corresponding light emitting element based on the power signal characteristic at (750).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent, structural elements with insubstantial differences from the literal languages of the claims.

What is claimed is:

1. A traffic lamp comprising:
   a light emitting element configured to emit light; and
   a controller coupled with the light emitting element, wherein the controller is configured to control light emission of the light emitting element separately and without a separate and remote control system by:
   initiating illumination of the light emitting element when a power signal is supplied to the traffic lamp;
   incrementing a counter to monitor an elapsed time interval; and
   discontinuing illumination of the light emitting element when the counter reaches a predetermined number.

2. The traffic lamp as in claim 1, wherein the light emitting element is a light emitting diode.

3. The traffic lamp as in claim 1, wherein a light emission timing of the light emitting element is based on a predetermined light emission timing sequence.

4. The traffic lamp as in claim 1, wherein the power signal is an AC power signal, and wherein the controller controls a light emission timing of the light emitting element based on a frequency or a period of the AC power signal.

5. The traffic lamp as in claim 1, wherein the traffic lamp is a flasher lamp.

6. A method of controlling a traffic lamp comprising:
receiving a power signal to power the traffic lamp; and
using a controller to:
- control a light emission of the traffic lamp; and
- control a light emitting element separately and without a separate and remote control system by:
  - initiating illumination of the light emitting element when a power signal is supplied to the traffic lamp;
  - incrementing a counter to monitor an elapsed time interval; and
  - discontinuing illumination of the light emitting element when the counter reaches a predetermined number.

7. The method as in claim 6, wherein the light emitting element is a light emitting diode.

8. The method as in claim 6, wherein the controller is configured to control the light emitting element based on a predetermined light emission timing sequence.

9. The method of claim 6, wherein the power signal is an AC power signal, and using the controller to control the light emitting element comprises:
- determining a frequency of the AC power signal; and
- controlling the light emitting element based on the frequency of the AC power signal.

10. The method of claim 6, wherein the power signal is an AC power signal, and using the controller to control the light emitting element comprises:
- determining a period of the AC power signal; and
- controlling the light emitting dement based on the period of the AC power signal.

11. The method as in claim 6, wherein using the controller to control the light emitting element comprises:
- controlling a plurality of light emitting elements, wherein each light emitting element is coupled to a separate controller.

12. The method as in claim 11, wherein the controller is configured to synchronize the plurality of light emitting elements based on the power signal provided to the traffic lamp.

13. A traffic lamp comprising:
- a plurality of light emitting elements configured to emit light; and
- a plurality of controllers, each controller coupled to a light emitting element, wherein each controller is configured to illuminate the respectively coupled light emitting element separately and without a separate and remote control system by:
- initiating illumination of the respectively coupled light emitting element when a power signal is supplied to the traffic lamp;
- incrementing a counter to monitor an elapsed time interval; and
- illuminating and discontinuing illumination of the respectively coupled light emitting element in a sequence as the counter reaches predetermined increments.

14. The traffic lamp as in claim 13, wherein the plurality of light emitting elements includes two light emitting elements and the light emission timing includes alternating light emissions for the light emitting elements.

15. The traffic lamp as in claim 13, wherein the traffic lamp is a flasher.

16. The traffic lamp as in claim 12, wherein the plurality of light emitting elements are light emitting diodes.

17. The traffic lamp as in claim 13, wherein the power signal is an AC power signal and each controller is configured to control the light emission timing based on a frequency or a period of the AC power signal.

* * * * *